United States Patent
Worthey

(10) Patent No.: US 11,933,635 B1
(45) Date of Patent: Mar. 19, 2024

(54) SENSOR MOUNT AND COMPONENTS THEREOF

(71) Applicant: Worthey Metrology Services, LLC, Friendswood, TX (US)

(72) Inventor: Ralph Worthey, Friendswood, TX (US)

(73) Assignee: WORTHEY METROLOGY SERVICES, LLC, Friendswood, TX (US)

( * ) Notice: Subject to any disclaimer, the term of this patent is extended or adjusted under 35 U.S.C. 154(b) by 0 days.

(21) Appl. No.: 18/045,786

(22) Filed: Oct. 11, 2022

Related U.S. Application Data

(60) Provisional application No. 63/255,225, filed on Oct. 13, 2021.

(51) Int. Cl.
*G01D 11/24* (2006.01)

(52) U.S. Cl.
CPC .................................... *G01D 11/24* (2013.01)

(58) Field of Classification Search
CPC ..................................................... G01D 11/24
See application file for complete search history.

(56) References Cited

U.S. PATENT DOCUMENTS 10,738,938 B2    8/2020    Becker et al.

FOREIGN PATENT DOCUMENTS

CN    111365690 A    *    7/2020

OTHER PUBLICATIONS

MetrologyWorks. Mount-Mag-8. Believed to be sold prior to Oct. 11, 2022.
MetrologyWorks. Low Profile Mount Base Plate with 3 1/2 Threaded Ring. https://www.metrologyworks.com/product/low-profile-mount-base-plate-with-3-1-2-threaded-ring/. Believed to be sold prior to Oct. 11, 2022.
The Survipod Boltfix 90. https://survipod.com/product/the-survipod-boltfix-90/?currency=USD. Believed to be sold prior to Oct. 11, 2022.

* cited by examiner

*Primary Examiner* — Jamel E Williams
(74) *Attorney, Agent, or Firm* — FisherBroyles, LLP; Craig W. Mueller

(57) ABSTRACT

Provided are mounting systems for ensuring precision measuring equipment is properly leveled. More specifically, the mounting system generally comprises an elbow with a first end for association with the vertical surface, and a second end for selective receipt of precision measuring equipment. The mounting system allows the precision measuring equipment to be mounted in usually impossible or unfeasible ways.

6 Claims, 3 Drawing Sheets

SENSOR MOUNT AND COMPONENTS THEREOF

This application claims the benefit of U.S. Provisional Patent Application Ser. No. 63/255,225, filed Oct. 13, 2021, the entire disclosure of which is incorporated by reference herein.

An Appendix is included herewith and is incorporated by reference herein.

FIELD OF THE INVENTION

Embodiments of the present invention generally relate to precision measuring instrument mounts. The mount of one embodiment is configured for selective interconnection to a vertical member to position an instrument upright.

SUMMARY OF THE INVENTION

According to the National Institute of Standards and Technology (NIST) of the US Department of Commerce, "metrology is the science of measurement and its application." Metrology is often used in construction or manufacturing, wherein machinery is calibrated before and during production to measure parts for quality assurance. As one of ordinary skill in the art will appreciate, metrology employs precision measuring instruments that must be maintained in predetermined orientations to provide the user with accurate measurements.

90° Mounting Bracket

Mounting a precision measuring instrument to a vertical surface, such as a steel or concrete beam, is often desirable. Mounting is commonly achieved by bolting or welding the instrument or an instrument mount to the vertical structure, which is not ideal as it damages the vertical structure. Rigidly interconnecting mounts to a vertical structure also does not allow for minute adjustments that may be needed to level the instrument.

Accordingly, one embodiment of the present invention is a 90° mounting bracket that selectively attaches to a vertical structure and allows the instrument to take accurate measurements at least up to 0.001 of an inch. In one embodiment of the present invention, the 90° mounting bracket is an elbow associated with a magnetic interconnection system at the first end for interconnection to a steel structure and an instrument interface at a second end. The first end may include threads that interconnect to corresponding threads provided on the magnetic interconnection system. The magnetic interconnection system may be switchable, i.e., provided with on/off capability for easy installation and removal. In operation, the magnet interconnected to the first end is selectively interconnected to a steel beam or wall, and the second end is positioned to maintain the instrument upright. The 90° mount can be used in construction or manufacturing applications where it is difficult to set equipment on flooring or in dirt/mud, which greatly compromises instrument accuracy.

The instrument interface can consist of a threaded member that selectively interconnects to a corresponding threaded member provided on the instrument or a clamp. In an alternate embodiment, the instrument interface is a plate with leveling functionality that receives the instrument by way of a threaded interconnection or another magnet interconnection system, which can be similar to that associated with the 90° mounting bracket's first end.

Low Profile Adjustable Instrument Mounting Plate

Tripods are often used to mount precision measuring equipment. Those of ordinary skill in the art will appreciate that tripods commonly consist of an upper surface with a threaded mount configured to receive an instrument. The tripod's legs and ends thereof, i.e., the feet, are selectively adjustable to ensure the instrument remains level. U.S. Pat. No. 10,708,938 provides an example of a common tripod. Tripods are sufficient in many applications, but a smaller profile solution is often required.

In some applications low-profile mounting systems, sometimes referred to as "trivets," are used to provide a stable mounting location for precision measuring devices. Trivets commonly consist of an instrument-receiving interface associated with at least three adjustable members ending in feet that contact a surface, e.g., the ground, a horizontal beam, or another generally horizontally situated surface. The adjustable members are configured to selectively move to level the plate so that the mounted precision measuring device functions as intended. The adjustable members often employ threads that provide minute leveling adjustments.

One embodiment of the present invention is an extremely low-profile horizontal mount comprised of a plate with a plurality of operatively interconnected adjustment devices, e.g., screws, that provides a selectively alignable base suited to receive a precision measuring instrument. The instrument may be directly interconnected to the base or affixed thereto with a magnet. The magnet may be mechanically interconnected to a top surface of the base through a threaded interconnection, an adhesive, or magnetic force.

The Summary of the Invention is neither intended nor should it be construed as being representative of the full extent and scope of the present invention. That is, these and other aspects and advantages will be apparent from the disclosure of the invention(s) described herein. Further, the above-described embodiments, aspects, objectives, and configurations are neither complete nor exhaustive. As will be appreciated, other embodiments of the invention are possible using, alone or in combination, one or more of the features set forth above or described below. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and no limitation as to the scope of the present invention is intended by either the inclusion or non-inclusion of elements, components, etc. in this Summary of the Invention.

The above-described benefits, embodiments, and/or characterizations are not necessarily complete or exhaustive, and in particular, as to the patentable subject matter disclosed herein. Other benefits, embodiments, and/or characterizations of the present invention are possible utilizing, alone or in combination, as set forth above and/or described in the accompanying figures and/or in the description herein below.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and drawing figures are to be understood as being approximations which may be modified in all instances as required for a particular application of the novel assembly and method described herein.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary and in the appended drawing figures.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

Figure 1:
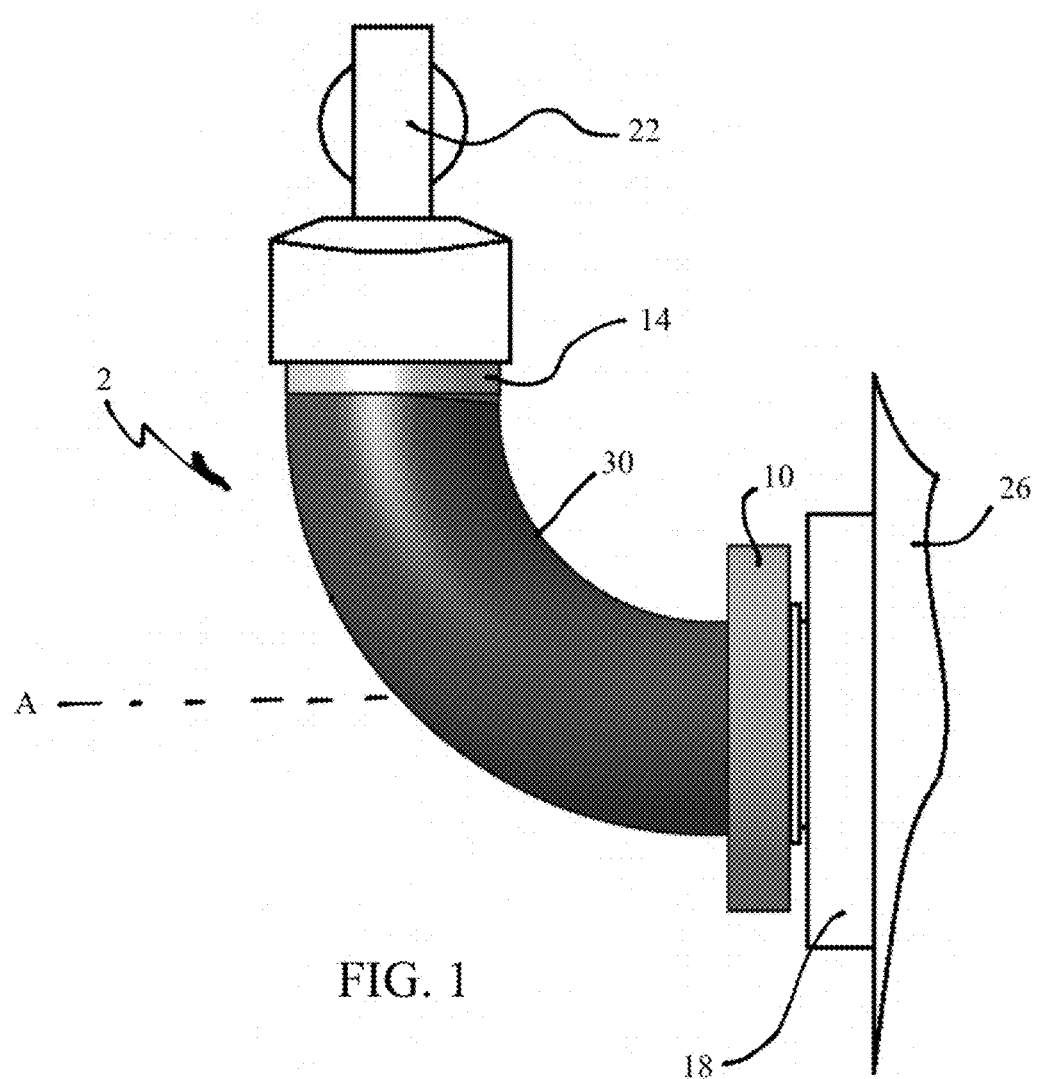
FIG. 1 is a side elevation view of a mounting bracket of one embodiment of the present invention that employs a 90° elbow.

The following component list and associated numbering found in the drawings is provided to assist in the understanding of one embodiment of the present invention:

Component
2 Mounting bracket
6 Elbow
10 First end
Component
14 Second end
18 Magnet
22 Instrument
26 Steel beam
30 Inner surface
102 Mounting plate
106 Base
110 Aperture
114 Upper surface
118 Lower surface
120 side surface
122 Instrument
126 Adjustment screw
130 End It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

FIG. 1 shows a mounting bracket 2 one embodiment of the present invention comprised of an elbow 6 defined by a first end 10 and a second end. The first end 10 is configured for selective interconnection to a magnet 18, and the second end 14 is configured for selective receipt of a measuring instrument 22 that may be capable of moving in multiple degrees of freedom.

In operation, the mounting bracket 2 is interconnected on its first end 10 to the magnet 18 that will interface with a vertical structure, such as a steel beam 26. Some embodiments of the present invention include an installation hook attached to the inner surface 30 of the elbow that selectively receives a chain used to hoist and support the mounting bracket during installation. As briefly mentioned above, the magnet 18 may be switchable, wherein it is abutted against the steel beam 26 while placing the second end 14 and the particular orientation, then activated to securely interconnect the mounting bracket 2 to the steel beam 26. The interface between the first end 10 and the magnet 18 may also be alterable in some embodiments, allowing the elbow 6 to be rotated about Axis A.

After the mounting bracket is positioned on a desired beam location, the instrument 22 is interconnected to the second end 14. One of ordinary skill in the art will appreciate that the interconnection between instrument 22 and the second end 14 may utilize adapters or other leveling devices or mechanisms to ensure the instrument 22 is oriented as desired.

Figure 2:
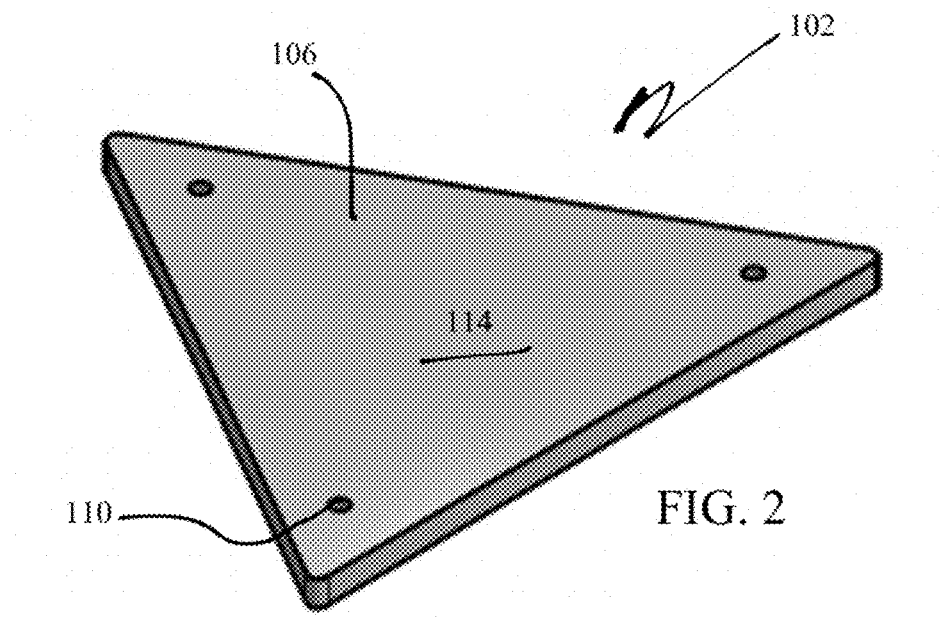
FIG. 2 is a top perspective view of a mounting plate.
Figure 3:
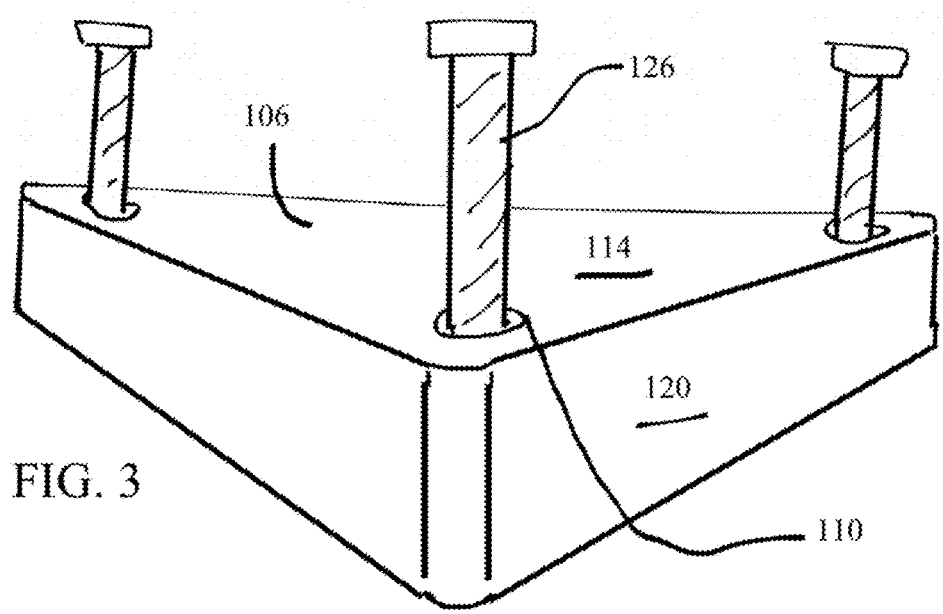
FIG. 3 is a front perspective view of the mounting plate shown in FIG. 2.
Figure 4:
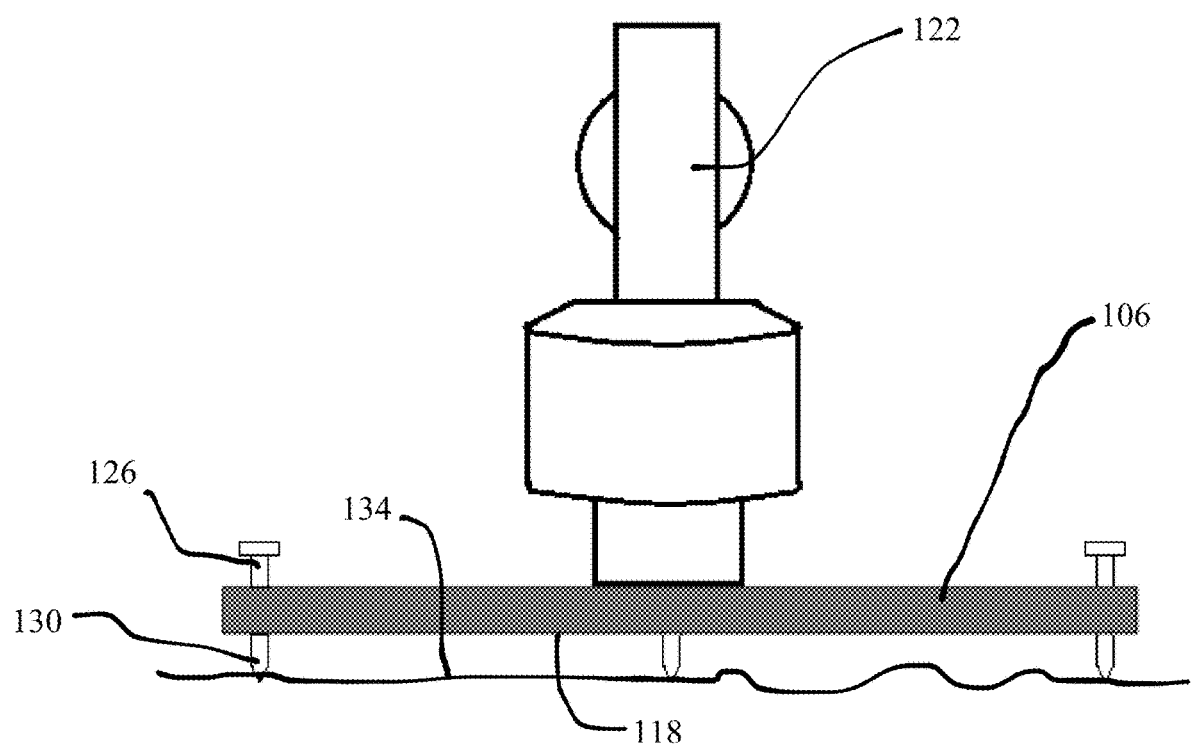
FIG. 4 is a front elevation view of the mounting plate of FIG. 2 supporting an instrument.

FIGS. 2-4 show a mounting plate 102 used to mount instruments 122 in different situations. Here, the mounting plate 102 consists of a base 106 with at least three apertures 110. Accordingly, the base 106 has an upper surface 114 and a lower surface 118 separated by a side surface 120. The mounting plate shown is triangular, but other shapes are contemplated and within the scope of the present invention. The contemplated system is easy to adjust for level setup and fits into tight spaces. The apertures 110 are threaded and selectively receive threaded adjustment screws 126.

The mounting plate of one embodiment is wide and, thus, provides increased stability to the precision measuring instrument, which allows measurements to at least about 0.001 of an inch. Further, the mounting system of this embodiment of the present invention will function with any equipment that uses 3½ inch threads to attach but is primarily designed for use with self-motorized equipment.

In operation, an instrument 122 is selectively interconnected to the base 106 by any method currently used. Thereafter, ends 130 of the adjustment screws 126 are placed in contact with an uneven surface 134 and the adjustment screws 126 are selectively rotated to alter the slope of the base. The mounting plate can be used in all construction sites, set on concrete column bases or floors, i.e., any flat or substantially flat surface.

Exemplary characteristics of embodiments of the present invention have been described. However, to avoid unnecessarily obscuring embodiments of the present invention, the preceding description may omit several known apparatus, methods, systems, structures, and/or devices one of ordinary skill in the art would understand are commonly included with the embodiments of the present invention. Such omissions are not to be construed as a limitation of the scope of the claimed invention. Specific details are set forth to provide an understanding of some embodiments of the present invention. It should, however, be appreciated that embodiments of the present invention may be practiced in a variety of ways beyond the specific detail set forth herein.

Modifications and alterations of the various embodiments of the present invention described herein will occur to those skilled in the art. It is to be expressly understood that such modifications and alterations are within the scope and spirit of the present invention, as set forth in the following claims. Further, it is to be understood that the invention(s) described herein is not limited in its application to the details of construction and the arrangement of components set forth in the preceding description or illustrated in the drawings. That is, the embodiments of the invention described herein are capable of being practiced or of being carried out in various ways. The scope of the various embodiments described herein is indicated by the following claims rather than by the foregoing description. And all changes which come within the meaning and range of equivalency of the claims are to be embraced within their scope. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A mounting system adapted for supporting a precision measuring instrument, comprising:
    an elbow having a first end and a second end, the second end having an interface for receiving a corresponding interface provided by the precision measuring instrument;
    a magnet having an interface configured to interconnect with a corresponding interface provided on the first end of the elbow; and
    wherein the mounting system is configured to maintain the precision measuring instrument in position so that the precision measuring instrument can make measurements to at least about 0.001 of an inch.

2. The mounting system of claim 1, wherein the magnet is switchable.

3. The mounting system of claim 1, wherein the magnet is an electromagnet.

4. The mounting system of claim 1, further comprising an adjustable adapter interconnected to the second end that is adapted to selectively receive the measuring instrument.

5. The mounting system of claim 1, wherein the elbow is selectively rotatable about an axis that is parallel to a normal axis of a surface to which the magnet is to be interconnected.

6. The mounting system of claim 1, further comprising an installation hook interconnected to an inner surface of the elbow.

* * * * *